(12) United States Patent
Nakajima et al.

(10) Patent No.: US 8,155,827 B2
(45) Date of Patent: *Apr. 10, 2012

(54) KEYLESS ENTRY SYSTEM (75) Inventors: Satoshi Nakajima, Miyagi-ken (JP);
Satoshi Hayasaka, Miyagi-ken (JP);
Suichi Nagaoka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1434 days.

This patent is subject to a terminal disclaimer.

(21) Appl. No.: 11/668,986

(22) Filed: Jan. 30, 2007

(65) Prior Publication Data
US 2007/0188301 A1 Aug. 16, 2007

(30) Foreign Application Priority Data
Feb. 1, 2006 (JP) ................................ 2006-024199

(51) Int. Cl.
*B60R 25/06* (2006.01)

(52) U.S. Cl. ..................................... 701/36; 340/426.16

(58) Field of Classification Search .................... 701/36; 340/426.16, 426.36, 425.5, 539.1, 825.69, 340/10.1, 10.34, 10.4, 426.35, 825.72, 539; 455/92, 99, 69, 70, 134, 152.1, 161.3, 226.2, 455/227
See application file for complete search history.

(56) References Cited

U.S. PATENT DOCUMENTS

| 7,471,187 | B2 * | 12/2008 | Nakashima et al. | ......... 340/5.61 |
| 7,518,489 | B2 * | 4/2009 | Nelson et al. | ............ 340/426.11 |
| 2002/0025823 | A1 | 2/2002 | Hara | |
| 2006/0267407 | A1 | 11/2006 | Nagaoka et al. | |

FOREIGN PATENT DOCUMENTS

| EP | 1 184 236 | 3/2002 |
| EP | 1 189 306 | 3/2002 |
| EP | 1 726 496 | 11/2006 |

OTHER PUBLICATIONS

Search Report dated May 31, 2007 for corresponding European Patent Application No. 07 00 2114.

* cited by examiner

*Primary Examiner* — Dalena Tran (74) *Attorney, Agent, or Firm* — Brinks Hofer Gilson & Lione (57) ABSTRACT

An on-vehicle control unit includes a memory storing a first data group having signal strength information of a plurality of request signals transmitted from a plurality of transmitting antennas before and after movement of a movable object when a portable device is placed along an inner surface of a vehicle and a second data group having signal strength information of the plurality of request signals transmitted from the plurality of transmitting antennas before and after the movement of the movable object when the portable device is placed along an outer surface of the vehicle. The on-vehicle control unit determines which of the first and second data groups request signal strength information received from the portable device closely resembles.

25 Claims, 8 Drawing Sheets

KEYLESS ENTRY SYSTEM

This patent document claims the benefit of Japanese Patent Application No. JP 2006-024199 filed on Feb. 1, 2006, which is hereby incorporated by reference.

BACKGROUND

1. Field

The present embodiments relate to a keyless entry system.

2. Related Art

Keyless entry systems can perform wireless communication between an on-vehicle device, which is installed in a vehicle, and a portable device, which is carried by users, so as to lock/unlock doors of the vehicle. Recently, passive keyless entry systems have been developed. In the passive keyless entry systems, upon detecting approach of a portable device to a vehicle, communication is automatically performed between an on-vehicle device and the portable device. The passive keyless entry systems lock/unlock doors of the vehicle after authenticating an ID uniquely set for each portable device. Unexamined Japanese Patent Application Publication No. 2002-77972 (US Patent Application Publication No. 2002/0025823) describes one such keyless entry systems.

It is important for passive keyless entry systems to be able to determine whether a portable device resides outside or inside of a vehicle. Thus, an on-vehicle device includes a plurality of transmitting antennas attached at various places of the vehicle. The on-vehicle device determines that the portable device resides inside the vehicle if the portable device receives a radio wave from the transmitting antennas attached inside the vehicle. Alternatively, the on-vehicle device determines that the portable device resides outside the vehicle if the portable device receives a radio wave from the transmitting antennas attached outside the vehicle.

However, in known keyless entry systems, accuracy of determination of positions of portable devices is not sufficient. For example, when a radio wave transmitted from a transmitting antenna attached inside a vehicle leaks outside the vehicle, the portable device may be mistakenly determined to reside inside the vehicle even if the portable device actually resides outside the vehicle. Conversely, when a radio wave transmitted from a transmitting antenna attached outside the vehicle leaks inside the vehicle, the portable device may be mistakenly determined to reside outside the vehicle even if the portable device actually resides inside the vehicle. If the radio wave transmission power is lowered in order to prevent the leakage of the radio wave, the portable device may not receive the radio wave even if the portable device is inside the vehicle. This may also cause the false determination.

A solution to this problem was described in Japanese Patent Application No. 2005-173219, which was filed by the assignee of the present patent document. An inside data group and an outside data group are obtained beforehand. The inside data group has intensity information of a plurality of signals transmitted from a plurality of transmitting antennas of the vehicle when a portable device is placed along an inner surface of the vehicle. The outside data group has intensity information of a plurality of signals transmitted from the plurality of transmitting antennas of the vehicle when a portable device is placed along an outer surface of the vehicle. Whether the portable device resides inside or outside the vehicle is determined by determining which of the inside data group and the outside data group the intensity data of the signal transmitted from each of the transmitting antennas and detected by the portable device closely resembles.

The transmitting antennas are attached to closable side mirrors of the vehicle. The inside data group and the outside data group are obtained with the side mirrors being opened. Thus, one embodiment of the above-cited application permits the determination of whether the portable device resides inside or outside the vehicle to be performed accurately if the side mirrors are opened.

However, if the side mirrors are closed, the strength of the signal detected by the portable device changes due to the change in the position of the transmitting antennas attached to the vehicle, which undesirably decreases the accuracy of the determination. This problem is not specific to a case where the transmitting antennas are attached to the side mirrors, and occurs when the transmitting antennas are attached to movable objects of the vehicle.

Even if the transmitting antennas are not attached to movable objects, movement of the movable objects may affect the radio wave transmitted from the transmitting antennas. In such a case, the strength of the signal detected by the portable device changes before and after the movement of the movable objects, which decreases the accuracy of the determination.

The determination of the position of the portable device is not limited to the determination of whether the portable device resides inside or outside the vehicle, and whether the portable device resides inside or outside of a boundary apart from the door by predetermined distance can also be determined. In such a case, a light may be turned on upon determining that the portable device is within a radius of a predetermined distance from, for example, the door.

Accordingly, a keyless entry system that can determine the position inside or outside a predetermined boundary, which is not limited to a boundary defining inside and outside of a vehicle, is desired.

SUMMARY

The present embodiments may obviate one or more of the above-described problems. For example, in one embodiment, a keyless entry system can accurately determine the position of a portable device even if a transmitting antenna is attached to a movable object of a vehicle or in a manner that the transmitted radio wave is affected by the movable object.

In one embodiment, a keyless entry system includes an on-vehicle device having an on-vehicle transmitting unit having a plurality of transmitting antennas, attached to a vehicle, for transmitting a request signal. At least one of the plurality of transmitting antennas is attached to a movable object installed in the vehicle or at a place where movement of the movable object affects a transmitted radio wave. An on-vehicle receiving unit receives an answer signal. An on-vehicle control unit performs a predetermined control operation after authenticating the answer signal transmitted from a portable device. The portable device has a portable device receiving unit that receives the request signal. A portable device transmitting unit transmits the answer signal. A portable device control unit detects the strength of each signal transmitted from the plurality of transmitting antennas in the on-vehicle device.

The on-vehicle control unit or the portable device control unit has a memory for storing data. The memory can store a first data group or a first parameter and a second data group or a second parameter. The first data group has signal strength information of each received signal transmitted from the plurality of transmitting antennas before and after the movement of the movable object when the portable device is placed along one side of a predetermined boundary set with respect to the vehicle. The first parameter is necessary for comparing the first data group and signal strength information.

The second data group has signal strength information of each received signal transmitted from the plurality of transmitting antennas before and after the movement of the movable object when the portable device is placed along the other side of the predetermined boundary set with respect to the vehicle. The second parameter is necessary for comparing the second data group and signal strength information. The on-vehicle control unit or the portable device control unit having the memory determines, using the first and second data groups or the first and second parameters, which of the first and second data groups the strength information obtained by receiving the signals transmitted from the plurality of the transmitting antennas by the portable device closely resembles.

In one embodiment, a keyless entry system includes an on-vehicle device having an on-vehicle transmitting unit having a plurality of transmitting antennas, attached to a vehicle, for transmitting a request signal. At least one of the plurality of transmitting antennas is attached to a movable object installed in the vehicle or at a place where movement of the movable object affects a transmitted radio wave. An on-vehicle receiving unit receives an answer signal. An on-vehicle control unit performs a predetermined control operation after authenticating the answer signal transmitted from the portable device. A portable device has a portable device receiving unit that receives the request signal, a portable device transmitting unit for transmitting the answer signal, and a portable device control unit for detecting the strength of each signal transmitted from the plurality of transmitting antennas in the on-vehicle device.

A detecting unit detects the movement of the movable object is provided on the movable object and connected to the on-vehicle control unit so that the detecting unit sends movement state information of the movable object to the on-vehicle control unit. The on-vehicle control unit has a memory storing data. The memory stores a pre-movement first data group or a pre-movement first parameter, a post-movement first data group or a post-movement first parameter, a pre-movement second data group or a pre-movement second parameter, and a post-movement second data group or a post-movement second parameter. The pre-movement first data group has signal strength information obtained by receiving signals transmitted from the plurality of transmitting antennas by the portable device before the movement of the movable object when the portable device is placed along one side of a predetermined boundary set with respect to the vehicle.

The pre-movement first parameter is necessary for comparing the pre-movement first data group and the signal strength information. The post-movement first data group has signal strength information obtained by receiving signals transmitted from the plurality of transmitting antennas by the portable device after the movement of the movable object when the portable device is placed along one side of the predetermined boundary set with respect to the vehicle. The post-movement first parameter is necessary for comparing the post-movement first data group and the signal strength information. The pre-movement second data group has signal strength information obtained by receiving signals transmitted from the plurality of transmitting antennas by the portable device before the movement of the movable object when the portable device is placed along the other side of the predetermined boundary set with respect to the vehicle. The pre-movement second parameter is necessary for comparing the pre-movement second data group and the signal strength information. The post-movement second data group has signal strength information obtained by receiving signals transmitted from the plurality of transmitting antennas by the portable device after the movement of the movable object when the portable device is placed along the other side of the predetermined boundary set with respect to the vehicle. The post-movement second parameter is necessary for comparing the post-movement second data group and the signal strength information.

In one embodiment, when the movement state information sent from the detecting unit indicates a state before the movement of the movable object, the on-vehicle control unit determines, using the pre-movement first and second data groups or the pre-movement first and second parameters, which of the pre-movement first and second data groups the signal strength information obtained by receiving the signals transmitted from the plurality of the transmitting antennas by the portable device closely resembles.

In one embodiment, when the movement state information sent from the detecting unit indicates a state after the movement of the movable object, the on-vehicle control unit determines, using the post-movement first and second data groups or the post-movement first and second parameters, which of the post-movement first and second data groups the signal strength information obtained by receiving the signals transmitted from the plurality of the transmitting antennas by the portable device closely resembles.

In one embodiment, the predetermined boundary set with respect to the vehicle may be a boundary defining the inside and outside of the vehicle.

In one embodiment, the predetermined boundary set with respect to the vehicle may be a boundary outward from the vehicle and apart from a transmitting antenna attached near a door of the vehicle by a predetermined distance.

In one embodiment, the on-vehicle control unit or the portable device control unit may calculate a Mahalanobis distance between the strength information of the signals and each of the data groups using each of the data groups or each of the parameters, and determine the signal strength information that closely resembles the data group having smaller Mahalanobis distance.

In one embodiment, the keyless entry system includes a memory that stores the first data group or the first parameter and the second data group or the second parameter. The first data group has signal strength information of a request signal transmitted from the plurality of transmitting antennas before and after the movement of the movable object when the portable device is placed along one side of a predetermined boundary set with respect to the vehicle. The second data group has signal strength information of a request signal transmitted from the plurality of transmitting antennas before and after the movement of the movable object when the portable device is placed along the other side of the predetermined boundary set with respect to the vehicle.

In one embodiment, the on-vehicle control unit or the portable device control unit determines which of the first and second data groups the strength information of the request signal closely resembles. In this embodiment, the keyless entry system can accurately determine the position of the portable device before and after the movement of the movable device, when the transmitting antennas are attached to the movable object installed in the vehicle or at a place where the movement of the movable object affect the radio wave.

In one embodiment, the detecting unit that detects the movement is provided on the movable object. The keyless entry system includes a memory that stores the pre-movement first data group and the post-movement first data group or the parameters necessary for resemblance determination corresponding to these data groups, and the pre-movement second data group and the post-movement second data group or the parameters necessary for resemblance determination corresponding to these data groups. The pre-movement and post-movement first data groups have signal strength information of the request signal transmitted from the plurality of transmitting antennas before and after the movement of the movable object, respectively, when the portable device is placed along one side of a predetermined boundary set with respect to the vehicle.

The pre-movement and post-movement second data groups have signal strength information of the request signal transmitted from the plurality of transmitting antennas before and after the movement of the movable object, respectively, when the portable device is placed along the other side of the predetermined boundary set with respect to the vehicle.

The on-vehicle control unit uses the different pre-movement and post-movement data groups or parameters according to the movement state of the movable object detected by the detecting unit. In this embodiment, the keyless entry system can accurately determine the position of the portable device before and after the movement of the movable device, when the transmitting antennas are attached to the movable object installed in the vehicle or at a place where the movement of the movable object affect the radio wave.

In one embodiment, the predetermined boundary set with respect to the vehicle may be a boundary defining the inside and outside of the vehicle. In this embodiment, the keyless entry system can determine whether the portable device resides inside or outside the vehicle.

In one embodiment, the predetermined boundary set with respect to the vehicle may be a boundary outward from the vehicle and apart from a transmitting antenna attached near a door of the vehicle by a predetermined distance. In this embodiment, the keyless entry system can determine whether the portable device is within a predetermined distance from the vehicle.

In one embodiment, the on-vehicle control unit or the portable device control unit may calculate a Mahalanobis distance between the strength information of the signals and each of the data groups using each of the data groups or each of the parameters, and determine the signal strength information closely resembles the data group having smaller Mahalanobis distance. In this embodiment, the keyless entry system can determine the position more accurately.

DETAILED DESCRIPTION

Figure 1:
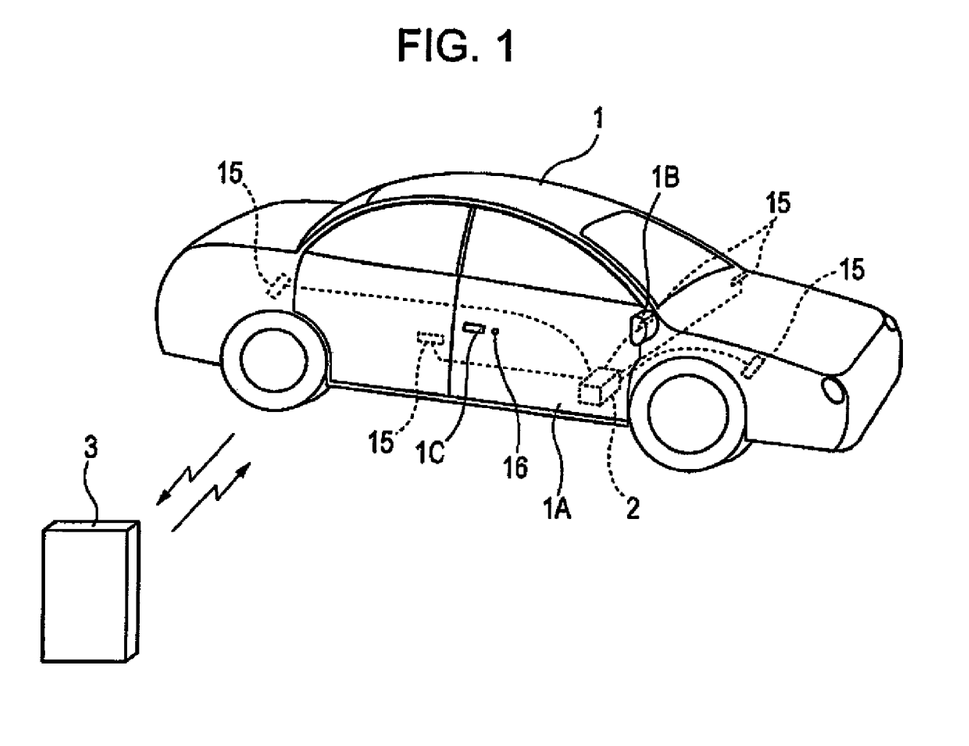
FIG. 1 is a schematic diagram of one embodiment of a keyless entry system.

In a first embodiment, as shown in FIG. 1, a keyless entry system locks/unlocks a door 1A of a vehicle 1. An on-vehicle device 2 is installed in the vehicle 1. A user carries a portable device 3 and gives instructions, such as an authentication instruction and locking/unlocking instructions, by performing wireless communication between the on-vehicle device 2 and the portable device 3. The on-vehicle device 2 has a plurality of transmitting antennas 15 attached at various places of the vehicle 1. Request signals are transmitted from each of the transmitting antennas 15 to the portable device 3. The request signals may be low frequency signals.

At least one of the transmitting antennas 15 is attached to a side mirror 1B, which is one of movable objects installed in the vehicle. The side mirror 1B is attached near a front end part of a front door 1A, and is automatically or manually opened/closed. FIG. 1 shows a state where the side mirror 1B is opened. When the vehicle 1 is parked at a parking lot or the like, it is possible to make a part of the side mirror 1B projecting from the side of the vehicle 1 smaller by closing the side mirror 1B so that the mirror surface is turned inside. Accordingly, a position of the transmitting antenna 15 attached to the side mirror 1B changes as the side mirror 1B is opened/closed.

A case where a user approaches the vehicle 1 and unlocks the door 1A will be described in one embodiment, the user carrying the portable device 3 has to press a request switch 16 provided near a doorknob 1C of a door 1A to unlock the door 1A. In response to pressing of the request switch 16, communication, such as authentication, is performed between the on-vehicle device 2 and the portable device 3. If the authentication is successful, the on-vehicle device 2 unlocks the door 1A.

Figure 2:
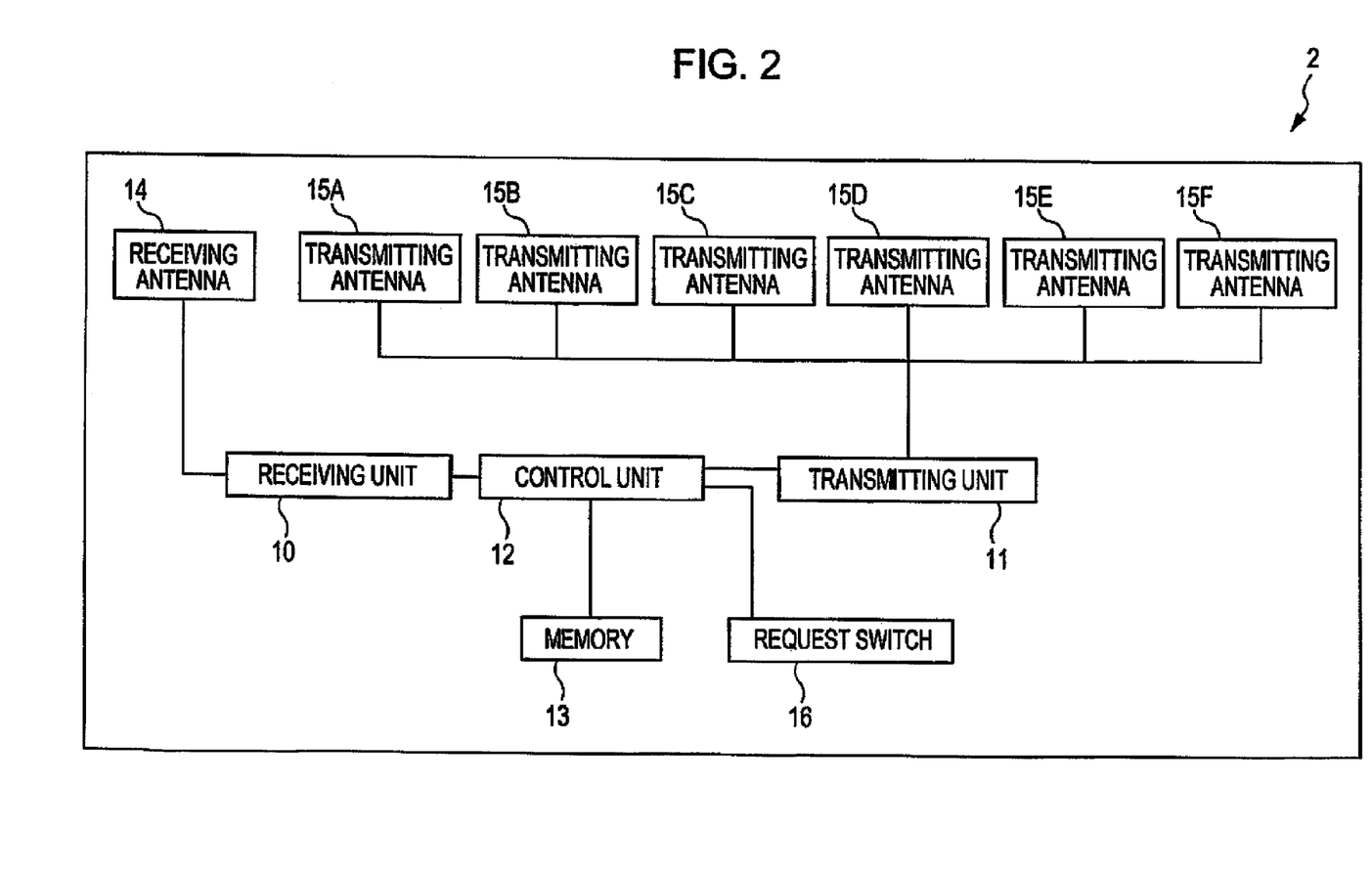
FIG. 2 is a block diagram of one embodiment of an on-vehicle device.
Figure 3:
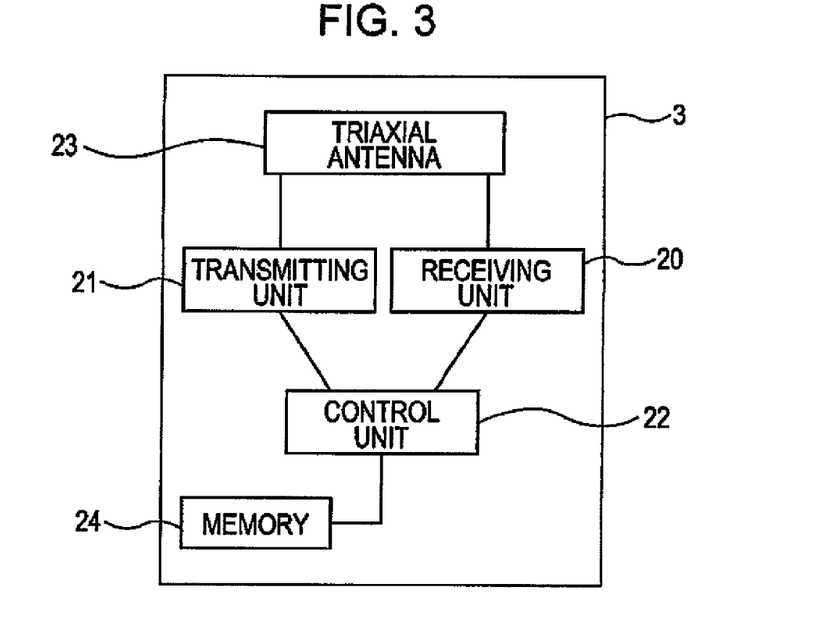
FIG. 3 is a block diagram of a portable device.

Configurations of the on-vehicle device 2 and the portable device 3 will be described next. FIGS. 2 and 3 show configurations of the on-vehicle device 2 and the portable device 3, respectively. As shown in FIG. 2, the on-vehicle device 2 has an on-vehicle receiving unit 10 for receiving answer signals from the portable device 3, an on-vehicle transmitting unit 11 for transmitting request signals to the portable device 3, and an on-vehicle control unit 12 for performing various control operations in response to reception of the answer signals and pressing of the request switch 16.

In one embodiment, the on-vehicle control unit 12 is connected to a memory 13 and the above-mentioned request switch 16. The memory 13 stores information necessary for the control operations, such as a V-ID (Vehicle-ID), which is an identification code unique to each vehicle, and IDs of a plurality of portable devices capable of remotely operating the vehicle. Additionally, the on-vehicle receiving unit 10 is connected to a receiving antenna 14 for receiving answer signals. The on-vehicle transmitting unit 11 is connected to a plurality of transmitting antennas 15A to 15F for transmitting request signals. The plurality of transmitting antennas 15A to 15F is attached at various places inside and outside the vehicle 1.

As shown in FIG. 3, the portable device 3 has a portable device receiving unit 20 for receiving request signals from the on-vehicle device 2, a portable device transmitting unit 21 for transmitting answer signals to the on-vehicle device 2, a portable device control unit 22 for performing various control operations in response to reception of the request signals, and a memory 24 storing, for example, an ID set for the portable device 3, the V-ID. A triaxial antenna 23 enabling reception/transmission of the request signals and the answer signals is connected to the portable device receiving unit 20 and the portable device transmitting unit 21.

A wave-up signal included in the request signal received by the portable device receiving unit 20 from the on-vehicle device 2 switches a state of the portable device control unit 22 from a sleep mode into a normal operational mode. In the sleep mode, the power consumption is substantially equal to zero. The portable device control unit 22 performs various operations on the basis of commands included in the request signals.

Figure 4:
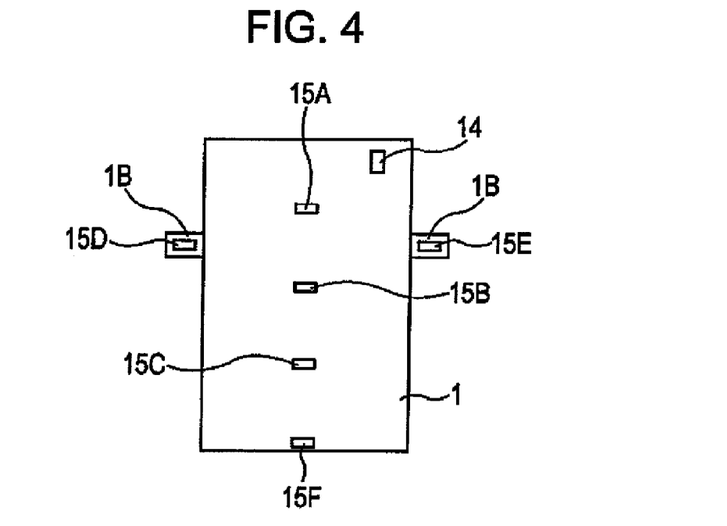
FIG. 4 is a diagram showing an arrangement of antennas attached to a vehicle.

FIG. 4 shows an arrangement of the receiving antenna 14 and the transmitting antennas 15A to 15F attached to the vehicle 1. The receiving antenna 14 is attached at a place inside the vehicle 1. Alternatively, the transmitting antennas 15A to 15F are attached at a plurality of places inside and outside the vehicle 1. In one embodiment, three transmitting antennas 15A to 15C are attached inside the vehicle 1, whereas three transmitting antennas 15D to 15F are attached outside the vehicle 1. The transmitting antennas 15D and 15E are attached at the side mirrors 1B of the vehicle 1.

The memory included in the on-vehicle device 2 stores IDs necessary for authenticating the portable device 3 and data used for determining the position of the portable device 3. The data used for determining the position of the portable device 3 may be parameters calculated from a first data group and a second data group. The first and second data groups have a plurality of data associating the strength of radio waves transmitted from each of the transmitting antennas 15 and received inside and outside the vehicle 1 and identification codes of the transmitting antennas 15.

Each data of the first data group includes, regarding three signals having three strongest strength in the vehicle near a border between inside and outside the vehicle 1 among those transmitted from each of the transmitting antennas 15, the identification codes for identifying the transmitting antennas 15 and the strength of the radio waves corresponding to these antennas. Such data is obtained beforehand substantially around an inner surface of the vehicle 1. Like the first data group, data of the second data group is obtained beforehand substantially around an outer surface near the border between the inside and outside the vehicle 1. These data is obtained for an actual vehicle 1 using the portable device 3 or a strength measuring device at the time of development of products. Alternatively, the data may be obtained at the time of manufacture.

The data of the second data group is obtained with the side mirror 1B, which is the movable object, being opened and also with the side mirror 1B being closed. All of the data collectively constitutes a second data group. Similarly, regarding the first data group, both the data obtained with the side mirror 1B being opened and the data obtained with the side mirror 1B being closed collectively constitute a first data group. After obtaining the first and second data groups, parameters used for calculating the Mahalanobis distance are calculated for each data group. These parameters are stored in the memory 13 as the data used for determining the position of the portable device 3.

When determining the position of the portable device 3, the portable device 3 first transmits data. The data includes, regarding the transmitting antennas 15 having transmitted signals having three strongest received signal strength among those transmitted from the transmitting antennas 15, identification codes for identifying the transmitting antennas 15 and the strength of the radio waves corresponding to these antennas. The on-vehicle control unit 12 calculates the Mahalanobis distance between the data transmitted from the portable device 3 and the first data group and the Mahalanobis distance between the transmitted data and the second data group using the parameters stored in the memory 13. The on-vehicle control unit 12 determines the smaller Mahalanobis distance, i.e., which data groups the data transmitted from the portable device 3 closely resembles, and determines that the portable device 3 resides on that side.

Figure 5:
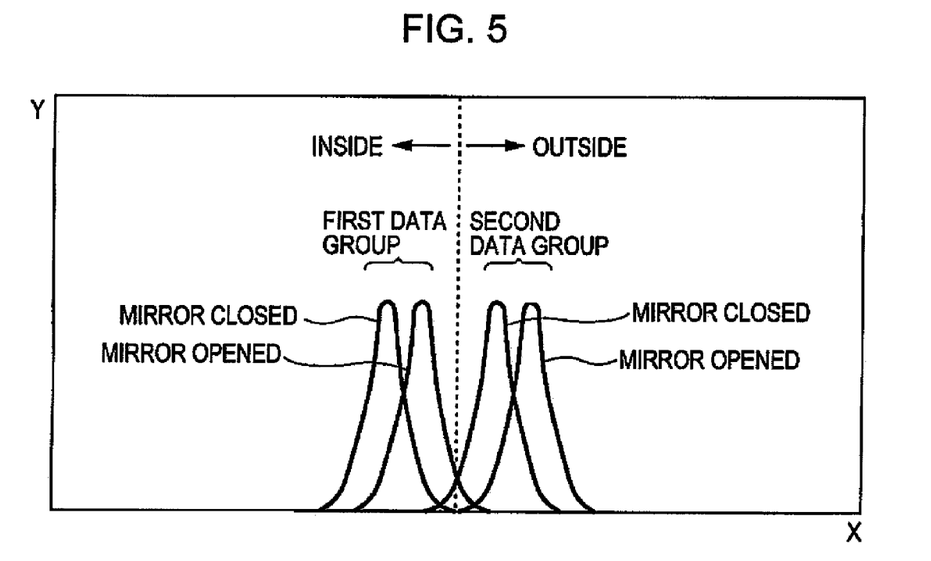
FIG. 5 is a diagram conceptually showing distribution of each data group.

FIG. 5 is a diagram conceptually showing distribution of each data group. In this diagram, the X-axis direction shows a position of the portable device 3 with respect to a contour of a vehicle in a plane perpendicular to the contour of the vehicle, whereas the Y-axis direction shows a frequency of appearance of measured data (the number of times that the data is measured). The portable device 3 is placed at a plurality of points along the contour of the vehicle, and position of the portable device 3 is calculated on the basis of the strength data obtained from each of the points. The data is collected and plotted while assigning the position to the X-axis and the number of times that the data is measured to the Y-axis.

As shown in FIG. 5, positions in the X-axis direction of peaks in the frequency shown in the Y-axis direction differ between the first data group obtained along the inner surface of the vehicle 1 and the second data group obtained along the outer surface of the vehicle 1. Additionally, in each of the first and second data groups, although most of data overlaps, the positions in the X-axis direction of the peaks in the frequency differ between when the side mirror 1B is opened and when the side mirror 1B is closed. In one embodiment, both the data obtained with the side mirror 1B being opened and the data, which has a frequency peak at the different position, obtained with the side mirror 1B being closed are combined to constitute the first data group, which includes the data obtained when the portable device 3 is placed along the inner surface of the vehicle 1.

Regarding the second data group, both the data obtained with the side mirror 1B being opened and the data obtained with the side mirror 1B being closed are combined, a Mahalanobis reference space is set, and a value of each parameter used for determining the Mahalanobis distance is determined.

Schematically, the determination of which of the data groups the strength information closely resembles is performed with respect to a border at the position of a broken line shown in FIG. 5, that is, the position corresponding to the middle of the first and second data groups. The position inside or outside the vehicle is determined by determining which data groups the strength information closely resembles.

For example, suppose that the data is obtained with the side mirror 1B being closed and the side mirror 1B is opened at the time of actual use. In such a case, since the border when the side mirror 1B is closed locates at the middle of the first and second data groups obtained with the mirror being closed, the border locates on the left side, in the X-axis direction, of the broken line shown in FIG. 5. Alternatively, when the side mirror 1B is opened, as is clear from the fact that the data groups are generally shifted to the right in the X-axis direction, the data obtained by the portable device 3 is shifted to the right compared with the data obtained with the side mirror 1B being closed. Thus, the border is also shifted to the right. Accordingly, even if the portable device 3 resides inside the vehicle, the possibility of determining that the portable device 3 resides on the right side of the border, i.e., outside the vehicle, increases, which in turn decreases the determination accuracy.

In one embodiment, since the Mahalanobis reference space is set after combining both the data obtained with the side mirror 1B being opened and the data obtained with the side mirror 1B being closed, the highly accurate determination can be performed regardless of the state (opened/closed) of the side mirror 1B.

Figure 6:
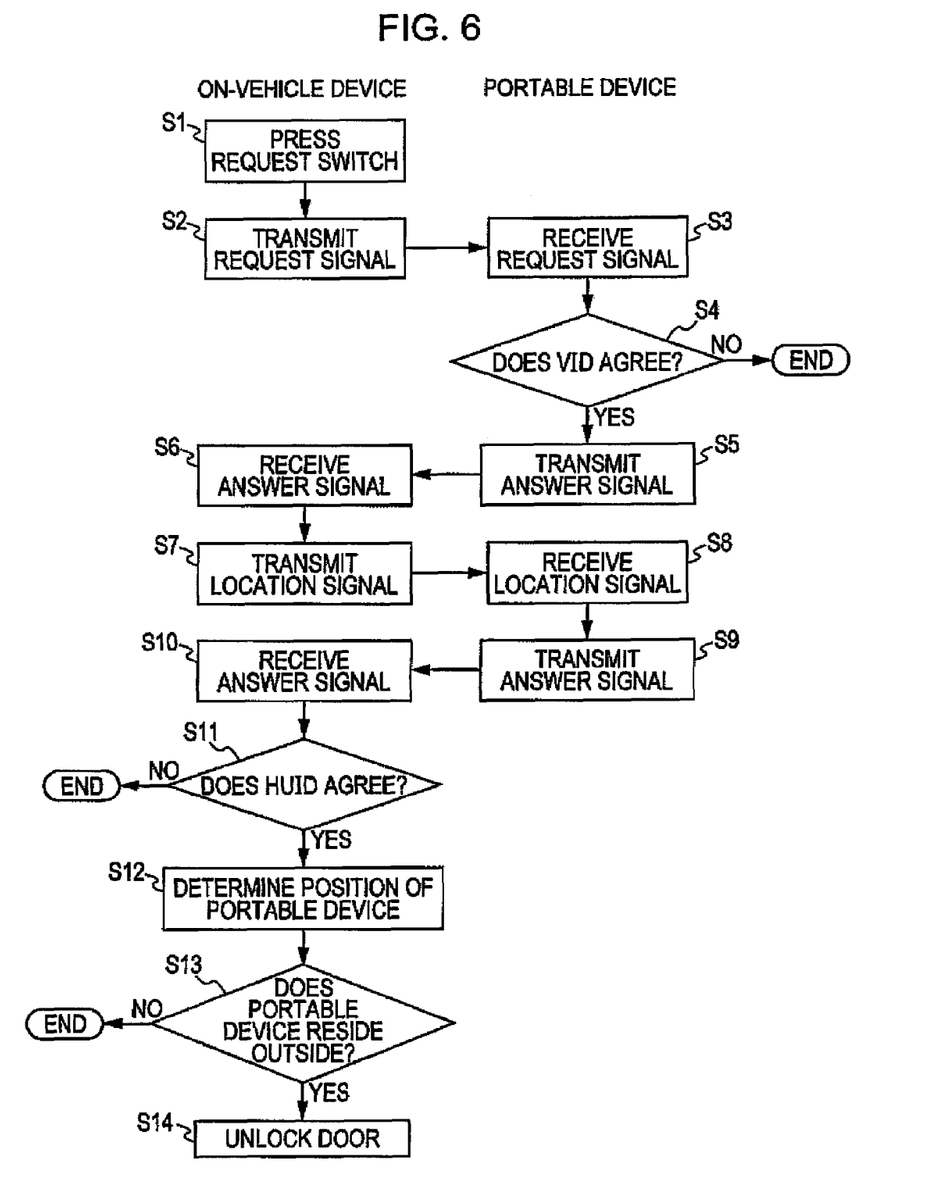
FIG. 6 is a flowchart during an unlocking operation.
Figure 7:
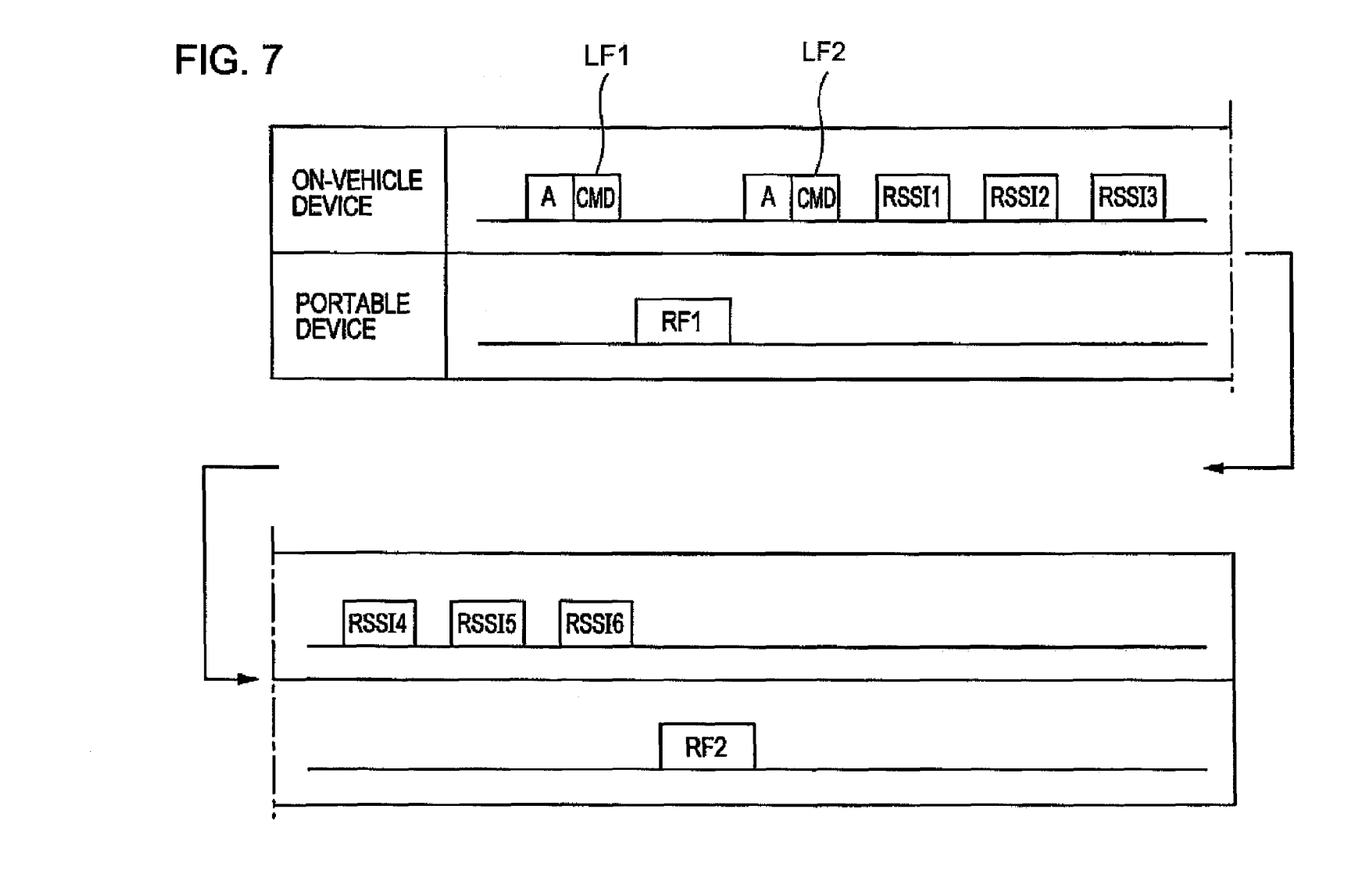
FIG. 7 is a chart of signals transmitted from an on-vehicle device and a portable device.

An operation of the keyless entry system will be described next. FIG. 6 shows a flowchart regarding an operation performed when unlocking a door. In addition, FIG. 7 shows a chart of signals transmitted from the on-vehicle device 2 and the portable device 3 during the operation shown in the flowchart of FIG. 6. In the keyless entry system according to the embodiment, pressing the request switch 16 provided on the vehicle 1 causes the on-vehicle device 2 and the portable device 3 to perform wireless communication, and then the door is unlocked. Thus, the flowchart starts when a user presses the request switch 16 on the vehicle 1 (S1).

In response to pressing of the request switch 16, the on-vehicle control unit 12 causes the on-vehicle transmitting unit 11 to transmit a request signal LF1 (S2). As shown in FIG. 7, the request signal LEF1 includes a signal A and a command signal CMD. The signal A contains a wake-up signal, and the command signal CMD contains information of the V-ID (Vehicle-ID), which is an identification code unique to the vehicle.

After the portable device 3 receives the request signal LF1 by the portable device receiving unit 20, the portable device control unit 22 is put into the normal operational state from the sleep state by the wake-up signal. The portable device control unit 22 then determines whether or not the V-ID contained in the request signal LF1 agrees with the V-ID stored therein. At this time, if the V-IDs disagree, the operation shown in the flowchart is finished. If the V-IDs agree, the portable device control unit 22 causes the portable device transmitting unit 21 to transmit an answer signal RF1 (S5).

After the on-vehicle receiving unit 10 receives the answer signal RF1 (S6), the on-vehicle control unit 12 causes the on-vehicle transmitting unit 11 to transmit a location signal LF2. As shown in FIG. 7, the location signal LF2 includes a signal constituted by the signal A and the command signal CMD, and a plurality of Rssi measurement signals sequentially transmitted from each of the transmitting antennas 15A to 15F. The signal A, like the request signal LF1, contains the wave-up signal as well as an ID of the portable device. The signal A is transmitted from all of the transmitting antennas 15A to 15F.

As shown in FIG. 7, the Rssi measurement signals transmitted from each of the transmitting antennas 15A to 15F are pulse-like signals that have predetermined strength and continue for a predetermined time, and are used for measuring the received signal strength by the portable device 3. Since the on-vehicle transmitting unit 11 transmits each of the Rssi measurement signals from each of the transmitting antennas 15A to 15F in a predetermined order and at predetermined intervals, the portable device 3 can identify the transmitting antenna 15 that transmitted the Rssi measurement signal by the receiving timings.

The portable device receiving unit 20 of the portable device 3 receives the location signal LF2 including the Rssi measurement signals transmitted from each of the transmitting antennas 15A to 15F (S8). The portable device control unit 22 measures the strength of each of the Rssi measurement signals in a manner as described above. Regarding three strongest data, the portable device transmitting unit 21 transmits the identification codes identifying the transmitting antennas 15 and the strength data corresponding to these antennas to the on-vehicle device 2 as an answer signal RF2 (S9). At this time, the answer signal RF2 including an HU-ID, which is uniquely set for each portable device, is transmitted. The signal strength measuring method is not limited to a method of measuring the strength of the Rssi measurement signals having been transmitted from the vehicle 1 by the portable device 3, and may be a method of directly measuring the strength of the request signals transmitted from the vehicle 1.

The on-vehicle receiving unit 10 of the on-vehicle device 2 receives the answer signal RF2 from the portable device 3 (S10). Upon receiving the answer signal RF2, the on-vehicle control unit 12 determines whether or not the HU-ID included in the answer signal agrees with the ID registered in the vehicle (S11). At this timer if the HU-ID disagrees with the one registered in the vehicle, the operation shown in the flowchart is finished. Alternatively, if the HU-ID agrees with the one registered in the vehicle, the on-vehicle control unit 12 determines the position of the portable device 3 next (S12).

When transmitting and receiving the request signal LF1, each portable device 3 transmits the answer signal RF1 after different time periods since the transmission of the request signal LF1. By measuring this time period, the responded portable device 3 is rapidly and easily identified among the plurality of portable devices 3. When transmitting and receiving the request signal LF2, using the ID uniquely, having a larger information amount, set for the portable device, accurate authentication and confirmation of the position are firstly performed for the portable device 3 detected using the request signal LF1. If the authentication fails, the same operation is performed for each of the portable devices 3. Only authentication of the portable device 3 may be performed without identifying the portable device 3 using the request signal. Alternatively, authentication of each of the portable devices 3 may be performed after transmitting the Rssi measurement signals.

To determine the position of the portable device 3, the Mahalanobis distances between the data detected by the portable device 3 and the first data group and between the detected data and the second data group are calculated using the identification codes and the strength data included in the answer signal RF2 transmitted from the portable device 3 and the parameters stored in the memory 13. If the detected data closely resembles the first data group, the portable device 3 is determined to reside inside the vehicle 1, whereas if the detected data closely resembles the second data group, the portable device 3 is determined to reside outside the vehicle 1.

The on-vehicle control unit 12 performs different control operations depending on whether the portable device 3 resides inside or outside the vehicle 1 (S13). If the portable device 3 is determined not to reside outside the vehicle 1, that is, if the portable device 3 is determined to reside inside the vehicle 1, the operation of the flowchart is finished.

When a user unlocks the door by pressing the request switch 16, the portable device 3 should be outside the vehicle 1. If the keyless entry system is configured to unlock the door when the portable device 3 resides inside the vehicle 1 with the user, even a person not carrying the portable device 3 can unlock the door by pressing the request switch 16. To prevent this, the keyless entry system is configured not to unlock the door when the portable device 3 resides inside the vehicle 1.

Alternatively, if the portable device 3 is determined to reside outside the vehicle 1, the on-vehicle device 2 outputs an unlock instruction signal to a door locking device (not shown) so as to unlock the door (S14). Since the position of the portable device 3 is determined by calculating the Mahalanobis distance from the first and second data groups, the position can be determined accurately, which thus can reduce the frequency of the false unlocking operation The first and second data groups are constituted by combining the data obtained before and after the movement of the side mirror 1B, which is a movable object of the vehicle 1. Thus, the position of the portable device 3 can be determined accurately regardless of the state (opened/closed) of the side mirror 1B.

The operation of unlocking the door by pressing the request switch 16 has been described here. In an operation of locking the door, the position of the portable device 3 is determined in the same manner, and a control operation can be performed according to the determination result. In addition, in other operations, not limited to the operation of locking/unlocking the door, such as an operation of starting an engine according to the position of the portable device 3, the position of the portable device 3 is determined in the same manner, and a control operation can be performed according to the determination result.

In one embodiment, although whether the portable device 3 resides inside or outside the vehicle 1 is determined, the position determination is not limited to this particular example. In another example of the position determination, whether the portable device 3 resides inside or outside the boundary outward from the vehicle 1 and apart from the vehicle 1 by a predetermined distance is determined. The determination is performed with respect to the boundary apart from the transmitting antenna 15 attached to the side mirror 1B of the vehicle 1 by 1.5 meter.

In one embodiment, each data of the first data group is obtained along a surface, on the side where the vehicle 1 is located, apart from the boundary by five centimeters. The boundary is apart from the transmitting antenna attached to the side mirror 1B of the vehicle 1 by 1.5 meter. The data obtained here is the same as the data described above. The data includes, regarding the transmitting antennas 15 that have transmitted signals having the three strongest received signal strength among those transmitted from the transmitting antennas 15, identification codes for identifying the transmitting antennas 15 and the strength of the radio waves corresponding to these antennas. Each data of the second data group is obtained along a surface, on the opposite side of the vehicle 1, apart from the boundary by five centimeters. The boundary is apart from the transmitting antenna attached to the side mirror 1B of the vehicle 1 by 1.5 meter.

The data is obtained with the side mirror 1B, i.e., the movable object, being opened and closed, and collectively constitutes each data group. Parameters used for calculating the Mahalanobis distance are calculated from each of these data groups and stored in the memory 13. The on-vehicle control unit 12 calculates each of the Mahalanobis distances between the data from the portable device 3 and the first data group and between the data and the second data group using the parameters stored in the memory 13. The on-vehicle control unit 12 determines whether the portable device 3 resides outside or inside the boundary. More specifically, the on-vehicle control unit 12 determines whether the portable device 3 is apart from the vehicle 1 by 1.5 meter or more or within a radius of 1.5 meter.

In one embodiment, the on-vehicle control unit 12 performs control operations according to the determination result. For example, if the portable device 3 is determined to be within a radius of 1.5 meter, a light, provided near the door of the vehicle 1, for illuminating a riding position is turned on. This configuration allows the user to easily get into the vehicle 1 and allows the vehicle 1 to inform the user that the vehicle 1 has recognized the existence of the portable device 3.

As described above, the boundary with respect to which the position of the portable device 3 is determined is not limited to the boundary defining the inside and outside the vehicle, and may be any boundaries inside or outside the vehicle set with respect to the vehicle 1. In still another example, in the vehicle 1, whether the portable device 3 resides on a driver's seat side or on a passenger's seat side can be determined. In this embodiment, the boundary is set at a surface between the drive's seat and the passenger's seat in the vehicle 1. The data of the first data group is obtained along one side of the boundary and the data of the second data group is obtained along the other side of the boundary. The parameters used for calculating the Mahalanobis distance are calculated. When determining the position of the portable device 3, each of the Mahalanobis distances between the data from the portable device 3 and the first data group and between the data and the second data group is calculated. Whether the portable device 3 resides outside or inside the boundary, for example, whether the portable device 3 resides on the driver's seat side or on the passenger's seat side, is determined.

Figure 8:
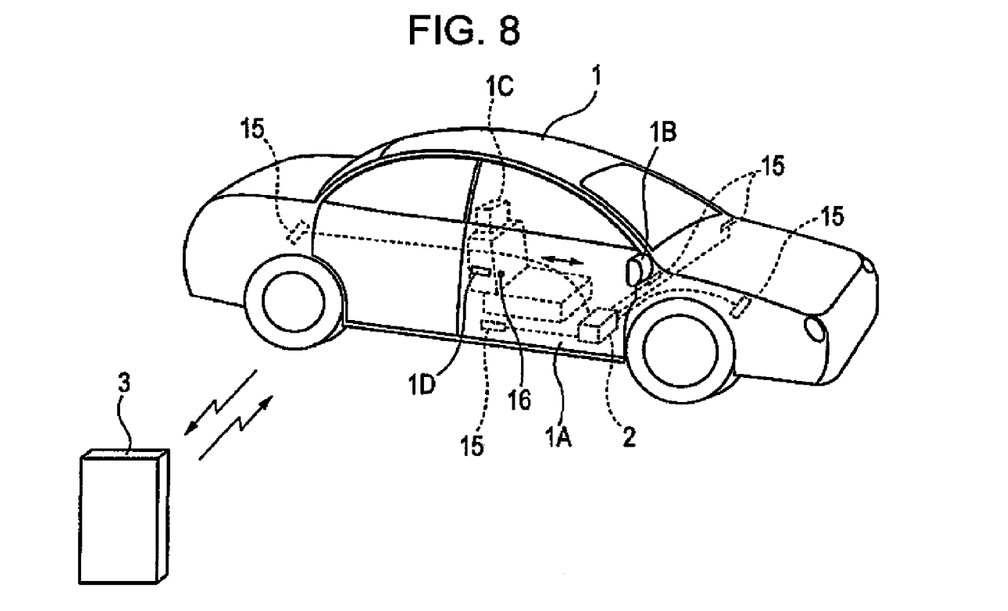
FIG. 8 is a schematic diagram of a keyless entry system according to another embodiment.

In another embodiment, as shown in FIG. 8, the keyless entry system according to the embodiment has substantially the same configuration as that according to the embodiment shown in FIG. 1. Thus, only the difference will be described.

As shown in FIG. 8, in the keyless entry system according to this embodiment, since the transmitting antenna 15 is not attached to the movable object, the position of the transmitting antenna 15 is fixed if the movable object moves. However, even if the transmitting antenna 15 is not attached to the movable object and the transmitting antenna 15 itself does not mover movement of the movable object may affect a radio wave transmitted from the transmitting antenna 15. For example, when the transmitting antenna 15 is attached near a side mirror 1B, i.e., the movable object, or near a seat that moves forward and backward inside the vehicle, the radio wave transmitted from the transmitting antenna is affected by the movement of the movable object. As shown in FIG. 8, in this embodiment, the transmitting antenna 15 is attached near the seat 1C in the vehicle, and movement of the seat 1C affects the transmitted radio wave.

In one embodiment, data of the first and second data groups is obtained on the both side of a randomly set boundary before and after the movement of the seat 1C, i.e., the movable object. By collectively using the data obtained before the movement of the seat 1C and the data obtained after the movement of the seat 1C as a data group used for determining the position of the portable device 3, the position of the portable device 3 can be accurately determined. In addition, as in the case of the first embodiment, the boundary may be any boundaries outside and inside the vehicle 1 in addition to the boundary defining the inside and outside of the vehicle. The rest is the same as the first embodiment.

Figure 9:
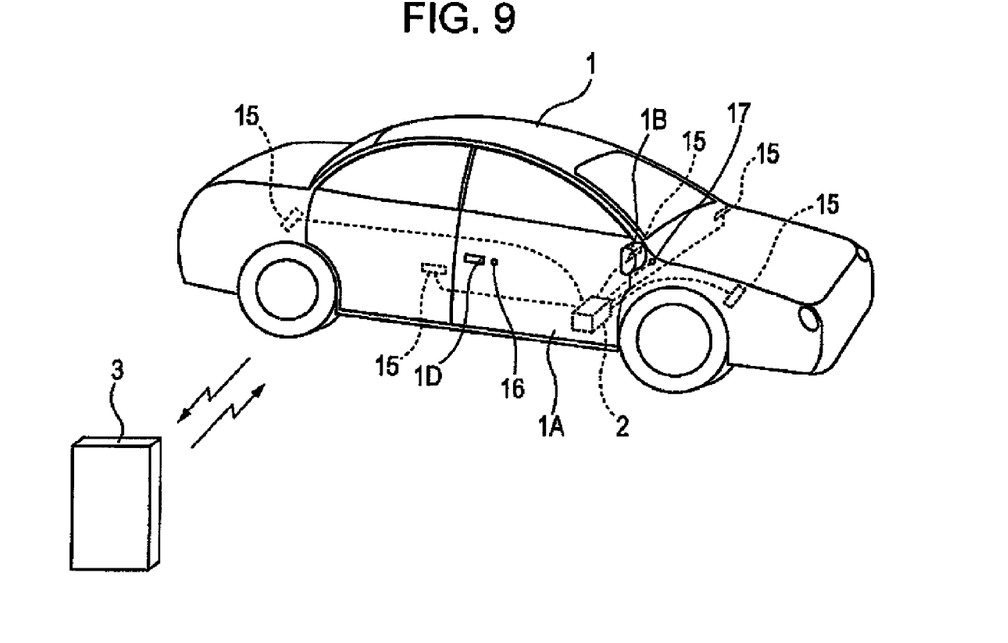
FIG. 9 is a schematic diagram of a keyless entry system according to another embodiment.

In a third embodiment, as shown in FIG. 9, the keyless entry system according to the embodiment has substantially the same configuration as the embodiment as shown in FIG. 1. Thus, in the following, the description of the points in common with the first embodiment is omitted, and only the difference will be described.

Figure 10:
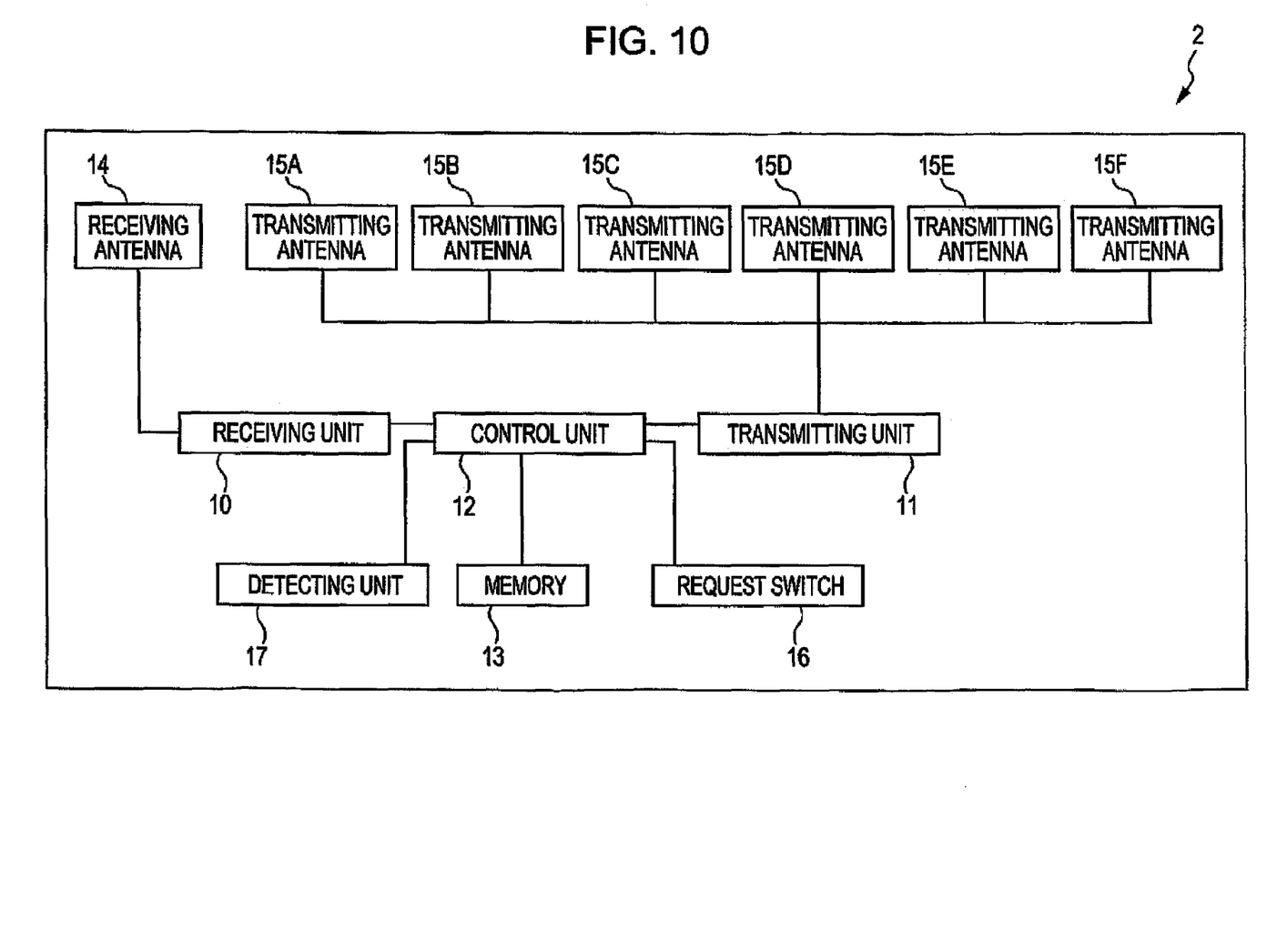
FIG. 10 is a block diagram of an on-vehicle device according to one embodiment.

As shown in FIG. 9, a detecting unit 17 for detecting a movement state of a side mirror 1B is attached to the side mirror 1B of a vehicle 1. The detecting unit 17 includes, for example, a limit switch or the like, and is capable of detecting a closed state or a opened state, which is a state before and after the movement of the side mirror 1B. In addition, FIG. 10 shows a block diagram of an on-vehicle device 2 according to the embodiment. As shown in this figure, the detecting unit 17 is connected to an on-vehicle control unit 12 of the on-vehicle device 2 so that the detecting unit 17 can send the opened/closed state information of the side mirror 1B to the on-vehicle control unit 12.

In one embodiment, the first and second data groups are obtained beforehand, which is the same as in the case of the first embodiment. However, in the embodiment, data is obtained before and after the movement of the side mirror 1B, i.e., the movable object, and treated as different data groups. The parameters used for calculating the Mahalanobis distance are calculated from the data groups, and stored in a memory 13. More specifically, the memory 13 stores parameters for a pre-movement first data group and a pre-movement second data group corresponding to the state where the side mirror 1B is opened, and parameters for a post-movement first data group and a post-movement second data group corresponding to the state where the side mirror 13 is closed.

When determining the position of the portable device 3, the on-vehicle control unit 12 first receives the opened/closed state information of the side mirror 1B from the detecting unit 17. When the side mirror 1B is opened, the on-vehicle control unit 12 reads out the parameters corresponding to the pre-movement first data group and the pre-movement second data group from the memory 13, and calculates the Mahalanobis distance using the parameters. Alternatively, when the side mirror 1B is closed, the on-vehicle control unit 12 reads out the parameters corresponding to the post-movement first data group and the post-movement second data group from the memory 13, and calculates the Mahalanobis distance using the parameters.

Accordingly, by using the pre-movement or post-movement parameters on the basis of the information sent from the detecting unit 17, the position of the portable device 3 can be accurately determined even if the transmitting antenna 15 is attached to the movable object. However, in this case, the state of the movable object can be obtained only when the detecting unit 17 is provided and operable. Thus, this configuration may not suitable for a case where the side mirror 1B is manually opened or closed. In addition, since both the pre-movement parameters and the post-movement parameters have to be stored in the memory 13, the amount of the stored data becomes larger. For a case where these become problematic, it is preferable to use the first embodiment.

In one embodiment, whether the portable device 3 resides inside or outside the vehicle 1 is determined. However, the position determination is not limited to this particular example, whether the portable device 3 resides inside or outside the boundary outward from the vehicle 1 and apart from the vehicle 1 by a predetermined distance, e.g., 1.5 meter, may be determined as in the case of the first embodiment.

In one embodiment, to determine whether the portable device 3 resides the driver's seat side or the passenger's seat side in the vehicle 1, data of the data groups may be obtained with respect to the boundary between the driver's seat and the passenger's seat. Moreover, third embodiment may be applied to the second embodiment. The pre-movement and post-movement data groups may be used for different circumstances by detecting the movement of the movable object that affects the transmitted radio wave.

While the embodiments of the present invention have been described above, application of the present invention is not limited to these embodiments, and various modifications are possible within the technical idea of the present invention. For example, in the first embodiment, three transmitting antennas 15 are attached inside and outside of the vehicle 1 as shown in FIG. 4. However, the number of the transmitting antennas 15 and the arrangement thereof are not limited to this particular example, and at least one transmitting antennas 15 may be attached inside and outside the vehicle 1. Nevertheless, the plurality of transmitting antennas 15 allows more accurate position determination. In addition, in the embodiments, although three signals corresponding to three strongest received signal strength are selected from those transmitted from the transmitting antennas 15 and used for the position determination as the data, the number of the data is not limited to three, and all the data may be used. Additionally, kinds of movable object is not limited to the side mirror 1B, and include, for example, a seat movable forward and backward and a height-adjustable steering wheel. Regarding these movable objects, data is obtained before and after the movement, and the position of the portable device 3 can be determined by separately or collectively using the data.

In addition, in the embodiments, the on-vehicle control unit 12 of the on-vehicle device 2 calculates the Mahalanobis distances between the data from the portable device 3 and the first data group and between the data and the second data group. However, the portable device 3 may have the similar memory as the memory 13. The parameters necessary for calculating the Mahalanobis distances for the first data group and the second data group may be stored in the memory. The portable device control unit 22 may be configured to calculate the Mahalanobis distances, and determine the position of the portable device 3.

The data stored in the memory is not limited to the parameters necessary for calculating the Mahalanobis distance corresponding to each data group as in the case of the embodiments, and first and second data groups themselves may be stored in the memory. In this case, when determining the position of the portable device 3, the parameters and the Mahalanobis distance are calculated from each data group. Although the first and second data groups are obtained at the time of the development or manufacture of the vehicle, calculation of the parameters, necessary for calculating the Mahalanobis distance, from each data group may be performed at any time after obtaining the data. However, the amount of the data stored in the memory 13 can be decreased by calculating the parameters beforehand and storing the parameters in the memory 13.

In one embodiment, the method for determining the position is not limited to the one calculating the Mahalanobis distance as in the case of the embodiments, and may be the one using a linear discriminant function. However, use of the Mahalanobis distance allows the position to be determined more accurately.

What is claimed is:

1. A method of determining a position of a portable device in a keyless entry system, the system including:
   an on-vehicle device having an on-vehicle transmitting unit having a plurality of transmitting antennas attached to a vehicle, that transmits a request signal, at least one of the plurality of transmitting antennas being attached to a movable object installed on the vehicle or at a place where movement of the movable object affects a transmitted radio wave,
   an on-vehicle receiving unit that receives an answer signal;
   an on-vehicle control unit that performs a predetermined control operation after authenticating the answer signal transmitted from a portable device;
   the portable device having
      a portable device receiving unit that receives the request signal;
      a portable device transmitting unit that transmits the answer signal;
      a portable device control unit that detects a strength of each signal transmitted from the plurality of transmitting antennas in the on-vehicle device, wherein
   the on-vehicle control unit or the portable device control unit having a memory that stores data;

the method comprising the steps of:

the memory storing in advance a first data group or a first parameter, the first data group having signal strength information of each received signal transmitted from the plurality of transmitting antennas before and after the movement of the movable object when the portable device is placed along an inside portion of the vehicle, the first parameter used for comparing the first data group and signal strength information, and the memory storing in advance a second data group or a second parameter, the second data group having signal strength information of each received signal transmitted from the plurality of transmitting antennas before and after the movement of the movable object when the portable device is placed along an outside portion of the vehicle, the second parameter used for comparing the second data group and signal strength information; and wherein the on-vehicle control unit or the portable device control unit configured to determine using the first and second data groups or the first and second parameters, which of the first and second data groups the strength information obtained by receiving the signals transmitted from the plurality of the transmitting antennas by the portable device closely resembles.

2. The method according to claim 1, wherein the outside portion of the vehicle and the inside portion of the vehicle define a predetermined boundary.

3. The method according to claim 2, wherein the on-vehicle control unit or the portable device control unit calculates a Mahalanobis distance between the strength information of the signals and each of the data groups using each of the data groups or each of the parameters, and determines the signal strength information closely resembles the data group having smaller Mahalanobis distance.

4. The method according to claim 1, wherein the on-vehicle control unit or the portable device control unit calculates a Mahalanobis distance between the signal strength information and each of the data groups using each of the data groups or each of the parameters, and determines the signal strength information closely resembles the data group having smaller Mahalanobis distance.

5. A keyless entry system comprising:

an on-vehicle device having an on-vehicle transmitting unit having a plurality of transmitting antennas, attached to a vehicle, that transmit a request signal, at least one of the plurality of transmitting antennas being attached to a movable object installed in the vehicle or at a place where movement of the movable object affects a transmitted radio wave, an on-vehicle receiving unit that receive an answer signal, and an on-vehicle control unit that perform a predetermined control operation after authenticating the answer signal transmitted from the portable device; and a portable device having a portable device receiving unit that receives the request signal, a portable device transmitting unit that transmits the answer signal, and a portable device control unit that detects a strength of each signal transmitted from the plurality of transmitting antennas in the on-vehicle device, wherein a detecting unit that detects the movement of the movable object is provided on the movable object and connected to the on-vehicle control unit so that the detecting unit can send movement state information of the movable object to the on-vehicle control unit, and wherein the on-vehicle control unit has a memory that stores data, the memory that stores a pre-movement first data group or a pre-movement first parameter, a post-movement first data group or a post-movement first parameter, a pre-movement second data group or a pre-movement second parameter, and a post-movement second data group or a post-movement second parameter, the pre-movement first data group having signal strength information obtained by receiving signals transmitted from the plurality of transmitting antennas by the portable device before the movement of the movable object when the portable device is placed along one side of a predetermined boundary set with respect to the vehicle, the pre-movement first parameter being necessary for comparing the pre-movement first data group and the signal strength information, the post-movement first data group having signal strength information obtained by receiving signals transmitted from the plurality of transmitting antennas by the portable device after the movement of the movable object when the portable device is placed along one side of the predetermined boundary set with respect to the vehicle, the post-movement first parameter being necessary for comparing the post-movement first data group and the signal strength information, the pre-movement second data group having signal strength information obtained by receiving signals transmitted from the plurality of transmitting antennas by the portable device before the movement of the movable object when the portable device is placed along the other side of the predetermined boundary set with respect to the vehicle, and the pre-movement second parameter being necessary for comparing the pre-movement second data group and the signal strength information, the post-movement second data group having signal strength information obtained by receiving signals transmitted from the plurality of transmitting antennas by the portable device after the movement of the movable object when the portable device is placed along the other side of the predetermined boundary set with respect to the vehicle, and the post-movement second parameter being necessary for comparing the post-movement second data group and the signal strength information, and wherein, when the movement state information sent from the detecting unit indicates a state before the movement of the movable object, the on-vehicle control unit determines, using the pre-movement first and second data groups or the pre-movement first and second parameters, which of the pre-movement first and second data groups the signal strength information obtained by receiving the signals transmitted from the plurality of the transmitting antennas by the portable device closely resembles, whereas, when the movement state information sent from the detecting unit indicates a state after the movement of the movable object, the on-vehicle control unit determines, using the post-movement first and second data groups or the post-movement first and second parameters, which of the post-movement first and second data groups the signal strength information obtained by receiving the signals transmitted from the plurality of the transmitting antennas by the portable device closely resembles.

6. A method of determining a position of a portable device in a keyless entry system, the system including:
   an on-vehicle device that is operable to transmit a request signal having a strength, the on-vehicle device including an on-vehicle controller;
   the portable device operable to transmit an answer signal having a strength, and including a portable device controller;
   a memory disposed in the on-vehicle device or the portable device;
   the method comprising the steps of:
      the memory storing in advance, a first and second data groups and/or first and second parameters having signal strength information of each signal; and
      wherein the first and second data groups or the first and second parameters are used, respectively by the on-vehicle controller or portable device controller to determine which of the first and second data groups the transmitted signals strength information closely resembles.

7. The method according to claim 6, wherein the on-vehicle device includes:
   a transmitting unit that transmits the request signal, the transmitting unit having a plurality of transmitting antennas; and
   a receiving unit that receives an answer signal; wherein
   the on-vehicle controller is operable to perform a predetermined control operation after authenticating the answer signal transmitted from a portable device.

8. The method according to claim 7, wherein the portable device includes:
   a portable device receiving unit that receives the request signal,
   a portable device transmitting unit that transmits the answer signal, and
   the portable device controller being operable to detect the strength of each signal transmitted from the plurality of transmitting antennas in the on-vehicle device.

9. The method according to claim 8, wherein the first data group having signal strength information of each received signal transmitted from the plurality of transmitting antennas before and after the movement of a movable object, which has at least one transmitting antenna disposed in it, when the portable device is placed along one side of a predetermined boundary set with respect to the vehicle, and the first parameter being necessary for comparing the first data group and signal strength information.

10. The method according to claim 9, wherein the second data group having signal strength information of each received signal transmitted from the plurality of transmitting antennas before and after the movement of the movable object when the portable device is placed along the other side of the predetermined boundary set with respect to the vehicle, and the second parameter being necessary for comparing the second data group and signal strength information.

11. The method according to claim 10, wherein the predetermined boundary set with respect to the vehicle is a boundary defining the inside and outside of the vehicle.

12. The method according to claim 10, wherein the predetermined boundary set with respect to the vehicle is a boundary outward from the vehicle and apart from a transmitting antenna attached near a door of the vehicle by a predetermined distance.

13. The method according to claim 10, wherein the on-vehicle control unit or the portable device control unit calculates a Mahalanobis distance between the strength information of the signals and each of the data groups using each of the data groups or each of the parameters, and determines the signal strength information closely resembles the data group having smaller Mahalanobis distance.

14. A method of determining a position of a portable device in a keyless entry system, the system including:
   an on-vehicle device that is operable to transmit a request signal having a strength, the on-vehicle device having a on-vehicle control unit;
   the on-vehicle control unit having a memory configured to store data;
   the portable device operable to transmit an answer signal having a strength; and
   a detecting unit configured to detect pre-movement and/or post-movement of a movable object;
   the method comprising the steps of:
      the memory storing in advance a pre-movement first data group or a pre-movement first parameter, a post-movement first data group or a post-movement first parameter, a pre-movement second data group or a pre-movement second parameter, and a post-movement second data group or a post-movement second parameter; and
      wherein the on-vehicle control unit or the portable control unit uses the pre-movement and/or post-movement parameters obtained by the detecting unit to determine which of the pre-movement or post-movement first and second data groups the signal strength information closely resembles.

15. The method according to claim 14, wherein the on-vehicle device includes:
   an on-vehicle transmitting unit having a plurality of transmitting antennas, attached to a vehicle, that transmit the request signal, at least one of the plurality of transmitting antennas being attached to a movable object installed in the vehicle or at a place where movement of the movable object affects a transmitted radio wave,
   an on-vehicle receiving unit for receiving an answer signal, and
   an on-vehicle control unit for performing a predetermined control operation after authenticating the answer signal transmitted from the portable device.

16. The method according to claim 15, wherein the portable device includes:
   a portable device receiving unit that receive the request signal,
   a portable device transmitting unit that transmits the answer signal, and
   a portable device control unit that detects the strength of each signal transmitted from the plurality of transmitting antennas in the on-vehicle device.

17. The method according to claim 16, wherein the pre-movement first data group has signal strength information obtained by receiving signals transmitted from the plurality of transmitting antennas by the portable device before the movement of the movable object when the portable device is placed along one side of a predetermined boundary set with respect to the vehicle, the pre-movement first parameter being necessary for comparing the pre-movement first data group and the signal strength information.

18. The method according to claim 17, wherein the post-movement first data group having signal strength information obtained by receiving signals transmitted from the plurality of transmitting antennas by the portable device after the movement of the movable object when the portable device is placed along one side of the predetermined boundary set with respect to the vehicle, the post-movement first parameter being necessary for comparing the post-movement first data group and the signal strength information.

19. The method according to claim 18, wherein the pre-movement second data group having signal strength information obtained by receiving signals transmitted from the plurality of transmitting antennas by the portable device before the movement of the movable object when the portable device is placed along the other side of the predetermined boundary set with respect to the vehicle, and the pre-movement second parameter being necessary for comparing the pre-movement second data group and the signal strength information.

20. The method according to claim 19, wherein the post-movement second data group having signal strength information obtained by receiving signals transmitted from the plurality of transmitting antennas by the portable device after the movement of the movable object when the portable device is placed along the other side of the predetermined boundary set with respect to the vehicle, and the post-movement second parameter being necessary for comparing the post-movement second data group and the signal strength information.

21. The method according to claim 20, wherein when the movement state information sent from the detecting unit indicates a state before the movement of the movable object, the on-vehicle control unit determines, using the pre-movement first and second data groups or the pre-movement first and second parameters, which of the pre-movement first and second data groups the signal strength information obtained by receiving the signals transmitted from the plurality of the transmitting antennas by the portable device closely resembles.

22. The method according to claim 21, wherein when the movement state information sent from the detecting unit indicates a state after the movement of the movable object, the on-vehicle control unit determines, using the post-movement first and second data groups or the post-movement first and second parameters, which of the post-movement first and second data groups the signal strength information obtained by receiving the signals transmitted from the plurality of the transmitting antennas by the portable device closely resembles.

23. The method according to claim 22, wherein the predetermined boundary set with respect to the vehicle is a boundary defining the inside and outside of the vehicle.

24. The method according to claim 22, wherein the predetermined boundary set with respect to the vehicle is a boundary outward from the vehicle and apart from a transmitting antenna attached near a door of the vehicle by a predetermined distance.

25. The method according to claim 22, wherein the on-vehicle control unit or the portable device control unit calculates a Mahalanobis distance between the strength information of the signals and each of the data groups using each of the data groups or each of the parameters, and determines the signal strength information closely resembles the data group having smaller Mahalanobis distance.

* * * * *